(12) United States Patent
Chang

(10) Patent No.: US 8,316,138 B2
(45) Date of Patent: Nov. 20, 2012

(54) PLUG-AND-SHOW USB PORTABLE DISK

(75) Inventor: Kuo-Lung Chang, Junghe (TW)

(73) Assignee: Awind Inc., Taipei County (TW)

( * ) Notice: Subject to any disclaimer, the term of this patent is extended or adjusted under 35 U.S.C. 154(b) by 234 days.

(21) Appl. No.: 12/876,338

(22) Filed: Sep. 7, 2010

(65) Prior Publication Data

US 2010/0332663 A1     Dec. 30, 2010

Related U.S. Application Data

(63) Continuation-in-part of application No. 11/563,063, filed on Nov. 24, 2006, now abandoned.

(51) Int. Cl.
*G06F 13/10* (2006.01)
*G06F 15/16* (2006.01)

(52) U.S. Cl. .......................... 709/227; 710/15

(58) Field of Classification Search .................. 709/205, 709/222, 227; 710/15, 18, 19, 20; 711/115
See application file for complete search history.

(56) References Cited

U.S. PATENT DOCUMENTS

| | | | | |
|---|---|---|---|---|
| 7,269,723 B2 * | 9/2007 | Cromer et al. | | 713/2 |
| 7,650,436 B2 * | 1/2010 | Bhesania et al. | | 710/8 |
| 2004/0240425 A1 * | 12/2004 | Chen et al. | | 370/349 |
| 2005/0041872 A1 * | 2/2005 | Yim et al. | | 382/232 |
| 2005/0109841 A1 * | 5/2005 | Ryan et al. | | 235/380 |
| 2005/0254440 A1 * | 11/2005 | Sorrell | | 370/264 |
| 2006/0173980 A1 * | 8/2006 | Kobayashi et al. | | 709/222 |
| 2006/0190941 A1 * | 8/2006 | Kobayashi et al. | | 717/174 |

FOREIGN PATENT DOCUMENTS

| | | | |
|---|---|---|---|
| EP | 1944686 A1 | * | 7/2008 |
| JP | 2002-313425 | * | 11/2003 |
| WO | 2004/038584 A1 | * | 5/2004 |

* cited by examiner

*Primary Examiner* — Wing F Chan
*Assistant Examiner* — Kostas Katsikis
(74) *Attorney, Agent, or Firm* — Ming Chow; Sinorica, LLC

(57) ABSTRACT

A plug-and-show USB portable disk, applied to a wireless presentation system including a computer, a wireless gateway wireless networking with the computer and a display apparatus connected with the wireless gateway, includes an image capturing and analyzing program and a plug-and-show program. The computer, further having a screen and a USB transmission port, is to transmit at least a presentation frame data to the screen for displaying respective presentation frame image. The image capturing and analyzing program is to capture and analyze the presentation frame data transmitted from the computer to the wireless gateway and to generate and forward an analysis result of the presentation frame data to the wireless gateway through the computer. The plug-and-show program is to control the computer to execute the image capturing and analyzing program as the USB portable disk engages with the USB transmission port.

12 Claims, 4 Drawing Sheets

PLUG-AND-SHOW USB PORTABLE DISK

CROSS-REFERENCE TO RELATED APPLICATION

This application is a continuation-in-part of, and claims a priority to application Ser. No. 11/563,063, filed on Nov. 24, 2006 now abandoned.

BACKGROUND OF THE INVENTION (1) Field of the Invention

The present invention relates to a USB portable disk, more particularly to a USB portable disk with a plug-and-show function, and also to a wireless presentation system applying the USB portable disk.

(2) Description of Prior Art

Referring now to FIG. 1, a framework of a conventional wireless presentation system is schematically shown. A gateway 1 located at a broadcast end of the system is connected with a projector 2. The gateway 1 is capable of internet wireless communication and data accessing and processing. A user end of the system is a computer 3 to display presentation frame data. The presentation frame data generated by the computer 3 is forwarded to the projector 2 for final imaging through the gateway 1 under a wireless network.

In the art, a wireless projector is made by integrating a conventional projector and a wireless gateway, and is further to connect with the computer wirelessly for performing a wireless presentation. It is noted that in the marketplace plenty of drive programs exist already to meet various types of wireless projectors. In particular, a specific drive program for the wireless projector is needed to be installed into the computer prepared for a corresponding wireless projector such that in a later time the projector can be activated to display the presentation frame data.

Nevertheless, different manufacturers provide different drive programs for their products. In particular, even the products from the same manufacturer may need different drive programs. Further, after the drive program is installed to the computer, a restart process is always needed to be executed in the computer.

Generally, in a presentation conference, plural representatives with their own computers may present to show their presentation files pre-stored in their own computers. It can be understood that majority of the representatives may ask to demonstrate their presentation files by using their own computers; even their own computers may be new to the projector officially prepared by the conference. However, if the computer does not pre-install the drive program for the official projector, the representative may need to install a proper drive program immediately at the conference site or loan a suitable computer to display their presentation files transferred to a USB portable disk.

Accordingly, prior art in wireless presentation conference has the following disadvantages.

First of all the disadvantages, if the representative want to demonstrate his/her presentation file via his/her own computer, a suitable drive program for a desired projector is needed and well installed in advance. If the installation is performed in the conference site right before his/her presentation, time needed for the installation as well as the restart process may ruin his/her presentation or at least cost the conference flow.

Secondly, most of the companies do not allow their employees to arbitrarily install commercial drive programs into the company own computers. Therefore, to an exterior presentation conference, a USB portable disk may be a better choice to store the presentation files, and loaning a suitable computer to display the presentation file become inevitable.

Thirdly, even that the computer can install the drive program, yet the new installation may quite possibly cause internal system confliction to the computer, and a later removal of the installation may cause possibly unexpected system problems.

Though, the wireless projector may provide the presenter all the convenience for the presentation, yet the problem of the drive program definitely degrades the convenience. Further, it is quite possible that different conferences may prepare different official wireless projectors. Under such a circumstance, the aforesaid preparation of a suitable computer would become a notorious problem to a presenter.

Therefore, an improvement for the wireless presentation system aimed to overcome the aforesaid shortcomings is definitely needed and welcome to the persons related to the field of wireless presentation.

SUMMARY OF THE INVENTION

Accordingly, it is the primary object of the present invention to provide a plug-and-show USB portable disk for connecting with a computer of a wireless presentation system and further for the computer to execute related programs of a wireless presentation.

It is another object of the present invention to provide a wireless presentation system. When a computer of the system establishes connection with a plug-and-show USB portable disk, the computer would perform related procedures of a wireless presentation.

In the present invention, the plug-and-show USB portable disk is applied to a wireless presentation system. The wireless presentation system includes a computer, a wireless gateway and a display apparatus (for example a projector or an LCD monitor). The computer further has a screen and a USB transmission port. The wireless gateway can connect with the computer wirelessly so as to perform data transmission and processing. The display apparatus can be integrated with the wireless gateway or can be an independent device.

The USB portable disk can be removable to connect with the USB transmission port of the computer, and can further include internally a wireless network detecting program, an image capturing and analyzing program and a plug-and-show program. All of the foregoing programs can be green software that can be auto-run while in engaging with the computer. When the computer senses an engagement between the USB portable disk and the USB transmission port, the computer would automatically execute commands/instructions of the plug-and-show program. These instructions can include a command to control the computer to perform the wireless network detecting program and a command to control the computer to perform the image capturing and analyzing program. The execution of the aforesaid two programs is described as follows.

The wireless network detecting program includes internally an extended service set identifier (ESSID) of the wireless gateway. When the USB portable disk engages with the USB transmission port of the computer, the wireless network detecting program would search automatically every wireless network signal around the computer, and further establish the wireless connection between the computer and the wireless gateway according to the ESSID.

The image capturing and analyzing program is mainly to capture and analyze the presentation frame data transmitted to the screen from the computer. The analysis result of the program will be forwarded to the wireless gateway through the computer.

In the present invention, the image capturing process can be performed as follows.

When the computer is to process a presentation, a presentation frame data would be transmitted to the screen for displaying thereon a respective presentation frame image. The image capturing and analyzing program of the present invention captures the presentation frame data transmitted from the computer to the screen in a software manner. For the transmission signals between the computer and the screen are digital signals, the captured data of the image capturing and analyzing program is also digital data. Even when the screen of the computer is power-off, the image capturing and analyzing program can still capture the presentation frame data from the computer.

In the present invention, the image analyzing process can be performed as follows.

In order to increase the wireless transmission speed, the presentation frame data captured by the image capturing and analyzing program of the present invention needs to be analyzed in advance before being transmitted to the wireless gateway through the computer.

Generally, a presentation file includes a plurality of presentation frame data. For example, a PowerPoint file usually has plural presentation frame data. While a presentation is carrying on, the computer will retrieve these data and then output these data in order to the screen for generating respective presentation frame images. In the transmission, the presentation frame data can be captured in order as well by the image capturing and analyzing program.

When the image capturing and analyzing program tells any difference between any two consecutive presentation frame data, the difference will be captured as a different frame image, and the different frame image is further formulated as a frame renewal data to be transmitted to the wireless gate way from the computer.

Upon such an arrangement, the computer needn't to forward the complete presentation frame data, but only the image renewal data to the wireless gateway. The wireless gateway can then integrate the preceding presentation frame data and the image renewal data to form the following presentation frame data. For the image renewal data is relatively smaller than then a complete presentation frame data, the wireless transmission speed can be substantially increased. In addition, to further increase the wireless transmission speed, the image capturing and analyzing program can compress the image renewal data prior to an outgoing transmission from the computer to the wireless gateway.

By applying the plug-and-show USB portable disk of the present invention and three internal green software, no new installation is required to each of the computers. Alternatively, the presentation can be initiated any time after the plug-and-show USB portable disk is plugged into the computer. When a new presentation is coming, the only change is only the process of changing the engagement of the computer and the plug-and-show USB portable disk of the present invention, i.e. connecting the plug-and-show USB portable disk to the next presentation computer. Apparently, by introducing the plug-and-show USB portable disk of the present invention to a presentation meeting involved plural computers, the presentation flow can be made smoothly and also possible communication confliction among computers can be reduced to a minimum.

All these objects are achieved by the plug-and-show USB portable disk described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a plug-and-show USB portable disk. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the plug-and-show USB portable disk is applicable to a wireless presentation system. As long as the USB portable disk engages with the wireless presentation system, a wireless presentation can be initiated immediately in a plug-and-show manner.

Figure 1:
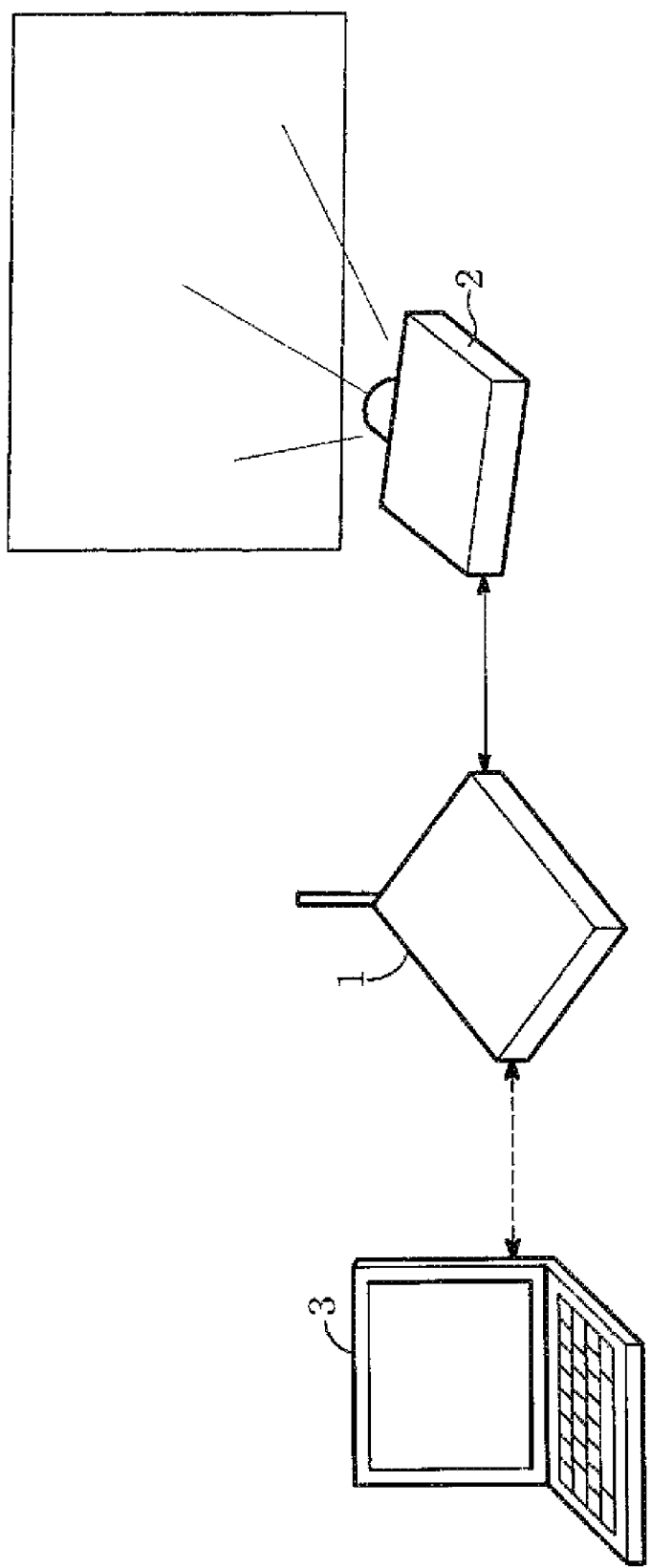
FIG. 1 is a framework of a conventional wireless presentation system.
Figure 2:
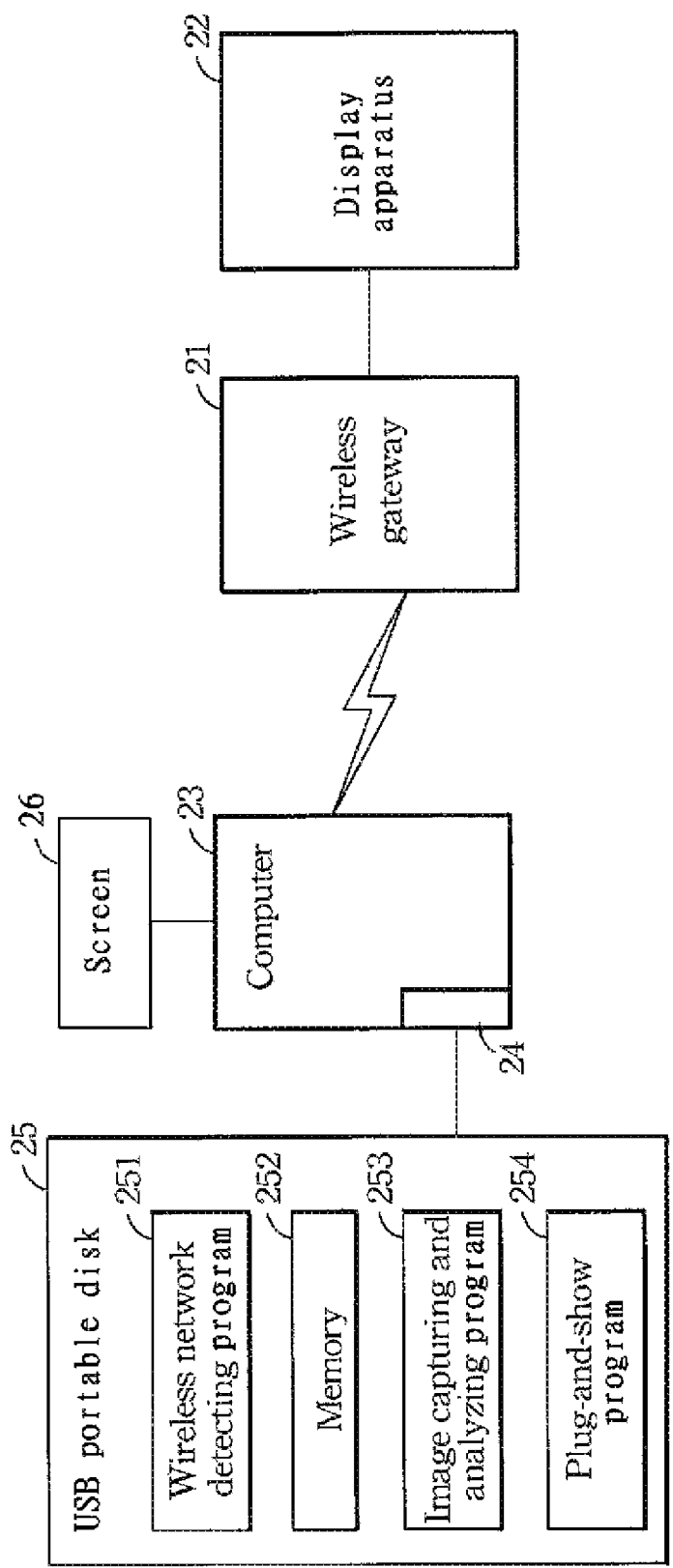
FIG. 2 is a block diagram showing a connection of the preferred plug-and-show USB portable disk in accordance with the present invention and a wireless presentation system.

Referring now to FIG. 2, a block diagram is to illustrate a typical connection of a preferred plug-and-show USB portable disk 25 in accordance with the present invention and a wireless presentation system.

As shown, the wireless presentation system has a wireless gateway 21 located at a broadcast end thereof and a display apparatus 22 (a projector or an LCD monitor, for example), and a computer 23 at a presentation end (i.e., the user end) thereof. The computer 23 has a USB transmission port 24 and a screen 26. The wireless gateway 21 can connect with the computer 23 wirelessly for performing wireless data transmission and processing in between. The display apparatus 22 can be integrated with the wireless gateway 21, or can work independently.

The USB portable disk 25 can connect with the USB transmission port 24 of the computer 23 in a removable manner. The USB portable disk 25 can include a wireless network detecting program 251, an image capturing and analyzing program 253 and a plug-and-show program 254. Preferably, all the aforesaid programs can be green software.

The green software is a software that can be executed directly in the computer without any pre-installation. The green software can be stored in the USB portable disk 25, and thus can be run immediately as soon as the USB portable disk 25 is engaged with the USB transmission port 24 of the computer 23. While the USB portable disk 25 disengages with the computer 23, the green software can be removed from the computer 23 automatically. For example, the well-known GreenBrowser is a green software. While a USB portable disk carrying the GreenBrowser is plugged to a transmission port 24 of a computer 23, the computer 23 can then explore the internet directly through the GreenBrowser without any installation process.

The plug-and-show program 254 is an auto-run program. While the computer 23 senses the engagement of the USB portable disk 25 and its transmission port 24, the computer 23 will automatically execute any instruction from the plug-and-show program 254, including the command to perform the wireless network detecting program 251 and the image capturing and analyzing program 253. The execution of the aforesaid two programs 251 and 253 is detailed as follows.

The wireless network detecting program 251 includes internally an extended service set identifier (ESSID) of the wireless gateway 21. When the USB portable disk 25 engages with the transmission port 24 of the computer 23, the wireless network detecting program 251 would search automatically every wireless network signal around the computer 23, and further establish the wireless connection between the computer 23 and the wireless gateway 21 according to the ESSID.

The image capturing and analyzing program 253 is to capture and analyze the presentation frame data transmitted to the screen 26 from the computer 23. The analysis result of the program 253 will be forwarded to the wireless gateway 21 through the computer 23.

In the present invention, the image capturing process can be performed as follows.

When the computer 23 is to process a presentation, a presentation frame data would be transmitted to the screen 26 for displaying thereon a respective presentation frame image. The image capturing and analyzing program 253 of the present invention captures the presentation frame data transmitted from the computer 23 to the screen 26 in a software manner. For the transmission signals between the computer 23 and the screen 26 are digital signals, the captured data of the image capturing and analyzing program 253 is also digital data. Even when the screen 26 of the computer 23 is power-off, the image capturing and analyzing program 253 can still capture the presentation frame data from the computer 23.

In the present invention, the image analyzing process can be performed as follows.

In order to increase the wireless transmission speed, the presentation frame data captured by the image capturing and analyzing program 253 of the present invention needs to be analyzed in advance before being transmitted to the wireless gateway 21 through the computer 23.

Generally, a presentation file includes a plurality of presentation frame data. For example, a PowerPoint file usually has plural presentation frame data. These frame data are stored in a hard disk of the computer 23 or in a memory of the USB portable disk 25, typically in a file format. While a presentation is carrying on, the computer 23 will retrieve these data from the hard disk or the memory and then output these data in order to the screen 26 for generating respective presentation frame images. In the transmission, the presentation frame data can be captured in order as well by the image capturing and analyzing program 253.

Figure 3:
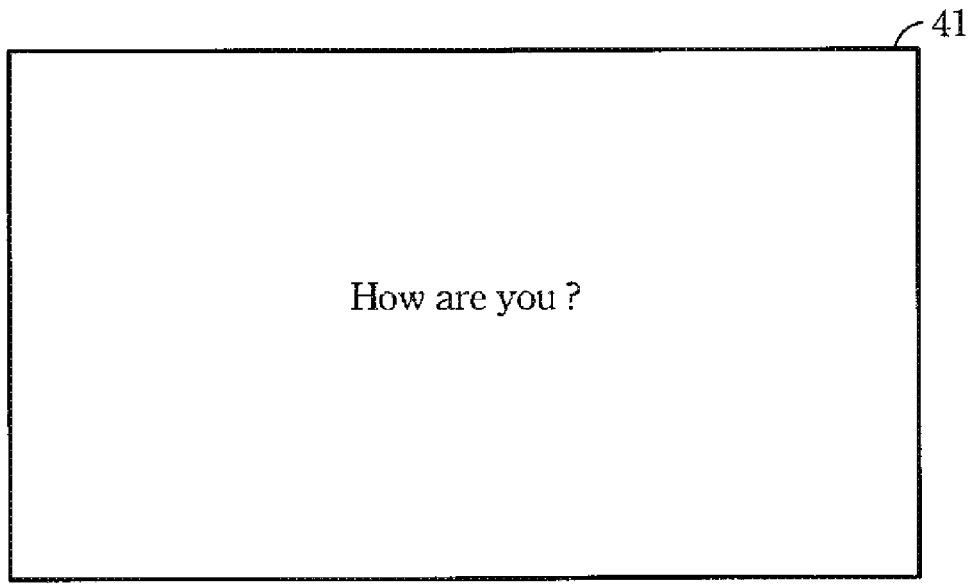
FIG. 3 shows an analysis process of the image capturing and analyzing program in accordance with the present invention.
Figure 3:
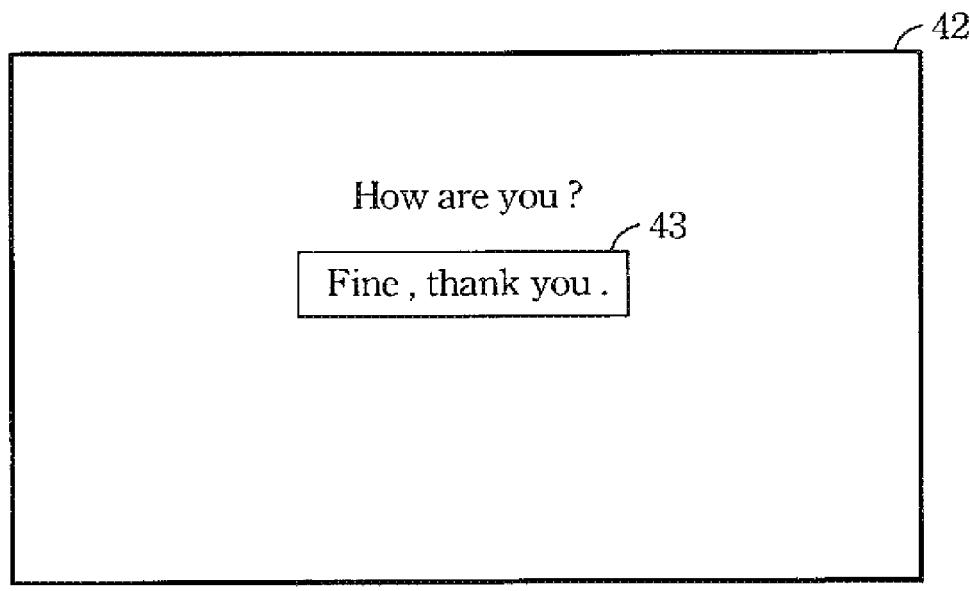

Referring now to FIG. 3, an analyzing process of the image capturing and analyzing program in accordance with the present invention is schematically shown. When the image capturing and analyzing program 253 tells any difference between any two consecutive presentation frame data, the difference will be captured as a different frame image, and the different frame image is further formulated as a frame renewal data to be transmitted to the wireless gateway 21 from the computer 23.

For example as shown in FIG. 3, the preceding frame image 41 includes only words of "How are you?", but the following frame image 42 includes additional words of "Fine, thank you.". At this instance, the image capturing and analyzing program 253 would capture the words "Fine, thank you." as the different frame image 43. The different frame image 43 is then formatted as an image renewal data by the image capturing and analyzing program 253, before it can be forwarded to the wireless gateway 21 by the computer 23.

Upon such an arrangement, the computer 23 need not to forward the complete presentation frame data, but only the image renewal data to the wireless gateway 21. The wireless gateway 21 can then integrate the preceding presentation frame data 41 and the image renewal data 43 to form the following presentation frame data 42. For the image renewal data 43 is relatively smaller than a complete presentation frame data, the wireless transmission speed can be substantially increased. In addition, to further increase the wireless transmission speed, the image capturing and analyzing program 253 can compress the image renewal data prior to an outgoing transmission from the computer 23 to the wireless gateway 21.

Figure 4:
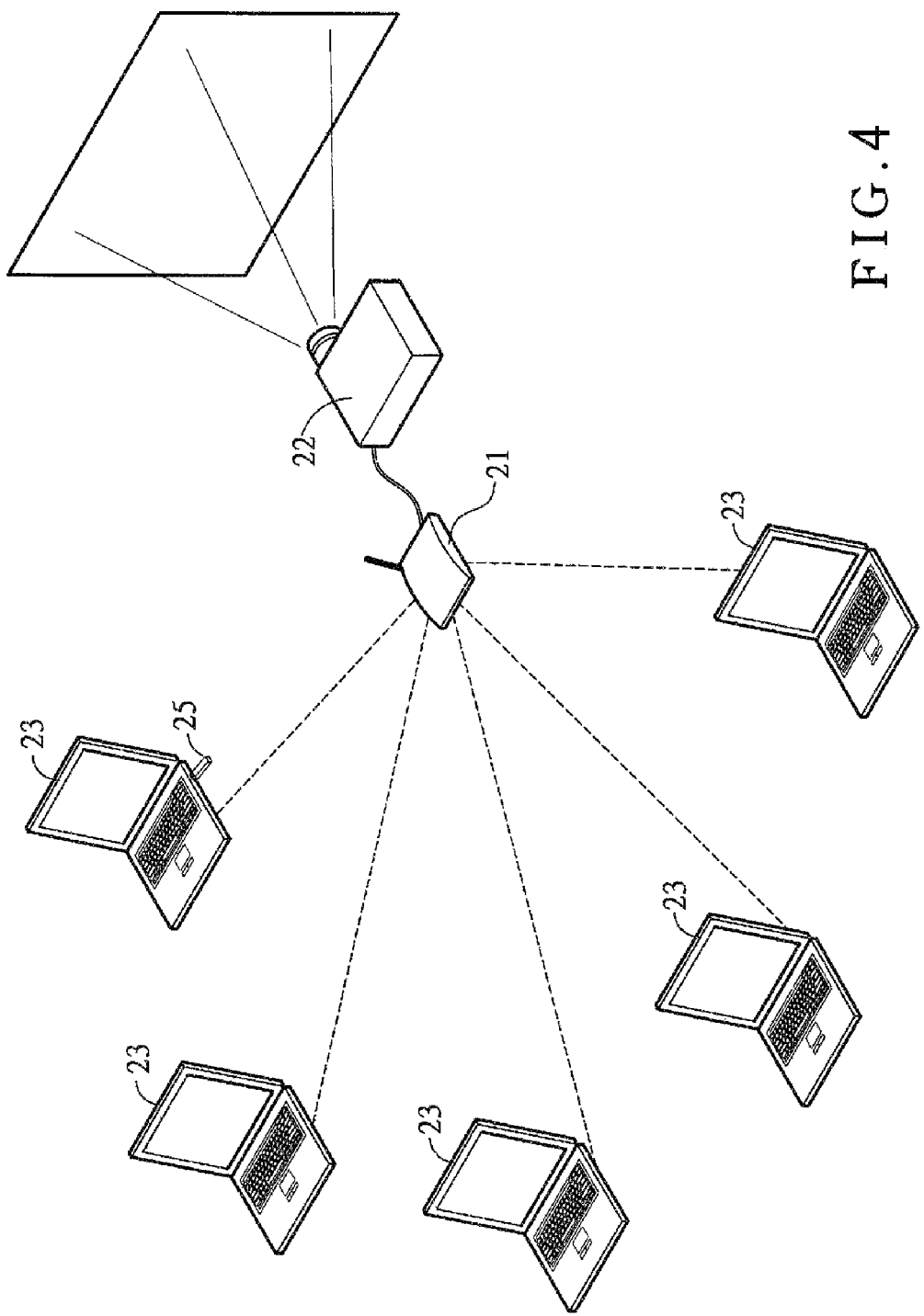
FIG. 4 demonstrates schematically a wireless application of a plug-and-show USB portable disk of the present invention.

Referring now to FIG. 4, a schematic view of a wireless application of a plug-and-show USB portable disk of the present invention is shown. As illustrated, the application includes a wireless gateway 21, a display apparatus 22 and a plurality of computers 23. Each of the computers 23 represents a participant in the meeting.

It can be easily understood that a tedious job of installing drive program of the display apparatus 22 to each of the computer 23 and the following restarting process in each computer 23 can be waived if the technology of the plug-and-show USB portable disk as described above in the present invention can be applied.

By applying the plug-and-show USB portable disk of the present invention, no new installation is required to each of the computers 23. Alternatively, the presentation can be initiated any time after the plug-and-show USB portable disk 25 is plugged into the computer 23. When a new presentation is coming, the only change is only the process of changing the engagement of the computer 23 and the plug-and-show USB portable disk 25 of the present invention, i.e. connecting the plug-and-show USB portable disk 25 to the next presentation computer 23. Apparently, by introducing the plug-and-show USB portable disk 25 of the present invention to a presentation meeting involved plural computers, the presentation flow can be made smoothly and also possible communication confliction among computers can be reduced to a minimum.

While the present invention has been particularly shown and described with reference to a preferred embodiment, it will be understood by those skilled in the art that various changes in form and detail may be without departing from the spirit and scope of the present invention.

I claim:

1. A plug-and-show USB portable disk, applied to a wireless presentation system including a computer, a wireless gateway wireless networking with the computer and a display apparatus connected with the wireless gateway, the computer further having a screen and a USB transmission port, the computer being to transmit at least a presentation frame data to the screen for displaying respective presentation frame image, the USB portable disk comprising:
   an image capturing and analyzing program for capturing and analyzing the presentation frame data transmitted from the computer to the screen and to generate and forward an analysis result of the presentation frame data to the wireless gateway through the computer;
   a plug-and-show program for controlling the computer to execute the image capturing and analyzing program as the USB portable disk engages with the USB transmission port; and a wireless network detecting program, said plug-and-show program controlling said computer to execute the wireless network detecting program to search said wireless gateway and further to establish wireless connection between said computer and said wireless gateway as said USB portable disk engages with said USB transmission port, wherein said plug-and-show program, said image capturing and analyzing program and said wireless network detecting program are all green software, and wherein said capturing and analyzing the presentation frame data transmitted from the computer to the screen, and generating and forwarding said analysis result are not executed in a batch.

2. The plug-and-show USB portable disk according to claim 1, wherein said display apparatus is a projector.

3. The plug-and-show USB portable disk according to claim 1, wherein said plug-and-show program is an auto-run program to have said computer to perform instructions of said plug-and-show program as long as said computer detects an engagement of said plug-and-show USB portable disk and said USB transmission port.

4. The plug-and-show USB portable disk according to claim 1 further including a memory for storing said presentation frame data.

5. The plug-and-show USB portable disk according to claim 1, wherein said image capturing and analyzing program further has a different frame data generated from at least a difference between any two consecutive said presentation frame data, the different frame data further being processed to form a frame renewal data by said image capturing and analyzing program, the frame renewal data being then forwarded to said wireless gateway via said computer.

6. The plug-and-show USB portable disk according to claim 1, wherein said computer further has a hard disk to store said presentation frame data.

7. A wireless presentation system, comprising:
a computer, further having a screen and a USB transmission port, the computer being to transmit at least a presentation frame data to the screen for displaying respective presentation frame image;
a wireless gateway, wireless networking with the computer;
a display apparatus, connected with the wireless gateway; and
a USB portable disk, removable connected with the USB transmission port, further including a plug-and-show program, an image capturing and analyzing program and a wireless network detecting program;

when the USB portable disk engages with the USB transmission port, the plug-and-show program controlling the computer to execute the image capturing and analyzing program, the image capturing and analyzing program capturing and analyzing the presentation frame data transmitted from the computer to the wireless gateway and to generate and forward an analysis result of the presentation frame data to the wireless gateway through the computer, and said plug-and-show program controlling said computer to execute the wireless network detecting program to search said wireless gateway and further to establish wireless connection between said computer and said wireless gateway as said USB portable disk engages with said USB transmission port;

wherein said plug-and-show program, said image capturing and analyzing program and said wireless network detecting program are all green software, and wherein said capturing and analyzing the presentation frame data transmitted from the computer to the screen, and generating and forwarding said analysis result are not executed in a batch.

8. The wireless presentation system according to claim 7, wherein said computer further has a hard disk to store said presentation frame data.

9. The wireless presentation system according to claim 7, wherein said USB portable disk further including a memory for storing said presentation frame data.

10. The wireless presentation system according to claim 7, wherein said display apparatus is a projector.

11. The wireless presentation system according to claim 7, wherein said plug-and-show program is an auto-run program to have said computer to perform instructions of said plug-and-show program as long as said computer detects an engagement of said plug-and-show USB portable disk and said USB transmission port.

12. The wireless presentation system according to claim 7, wherein said image capturing and analyzing program further has a different frame data generated from at least a difference between any two consecutive said presentation frame data, the different frame data further being processed to form a frame renewal data by said image capturing and analyzing program, the frame renewal data being then forwarded to said wireless gateway via said computer.

* * * * *